UNITED STATES PATENT OFFICE.

CLINTON S. ROBISON, OF CHICAGO, ILLINOIS, ASSIGNOR TO THE METALLIC SMELTING AND REFINING COMPANY, OF CHICAGO, ILLINOIS, A CORPORATION OF ILLINOIS.

PROCESS OF RECOVERING METALS.

1,180,435.      Specification of Letters Patent.      Patented Apr. 25, 1916.

No Drawing.      Application filed February 12, 1912. Serial No. 677,132.

*To all whom it may concern:*

Be it known that I, CLINTON S. ROBISON, a citizen of the United States, residing at Chicago, in the county of Cook and State of Illinois, have invented certain new and useful Improvements in Processes of Recovering Metals, of which the following is a full, clear, concise, and exact description.

My invention relates to the recovery of metals from substances bearing the metal in its elemental state and contemplates an improved process for that purpose. My invention is concerned with the recovery of metals which occur in such substances in their chemically free, natural or elemental state, either alone or in an alloy.

I am aware that it has been the practice in the various methods of smelting to fuse the metal bearing substances with chemically responsive fluxes, this combination resulting in the reduction of the metals contained in the charge. In other words, there is a chemical reaction which is relied upon to deliver the metal or metals from the non-metals or slag matter, the latter substances settling to the bottom or draw-ports of the furnace or crucible, whichever the case may be.

My invention primarily involves the idea of employing the flux purely as a heat-conducting medium and I rely upon certain physical characteristics of the flux and not upon its chemical activity. The fact that I do not need the chemical response of the flux makes it possible for me to adjust its physical properties, such as specific gravity, its melting point, its heat capacity, and so on. Thus, it is the theory of my invention that the flux is used, first, purely as a heat-conducting agent capable of holding within it, that is entirely surrounding, the metal-bearing substance to be treated; second, as a physical separating medium, due to its specific gravity as compared with that of the metal or metals or slag matter.

I charge the metal-bearing substance to be treated into a mass of previously melted flux, this flux having certain physical properties hereinafter pointed out. The flux is constantly heated by a suitable furnace, being thus kept in molten condition, and is superheated so that the excess heat which it absorbs is transmitted to the contained charge. This action melts the metals or alloys of metals carried in the metal-bearing substance.

The specific gravity of the flux is less than that of the metal or alloys of metals to be recovered and is capable of holding in solution or suspension the impurities segregated by the smelting operation.

The melting point of the flux must be the same or greater than the metal to be recovered, and must be capable of being raised several degrees above its melting point without profuse distillation or dissemination. Under these conditions, the metal to be recovered will settle to the bottom of the mass of flux and may be taken therefrom in any suitable manner. The flux does have a restriction as to its formula in that it should be such as not to chemically attack the metals to be recovered. It may advantageously be such as to react with the impurities carried by the metals themselves, although it is not expected that the metals which settle to the bottom shall be completely refined. There will always be a variable degree of impurity.

It is an important fact in my process that, since the metal-bearing substance is charged into the previously melted flux, the metal or metals to be recovered will be protected at all times. The air is excluded during the smelting and in this way oxidation and the absorption of impurities is effectively prevented. It follows, from the nature of the process, that the metal or metals to be recovered cannot be heated above the distilling point of the flux and in this way there is a check which prevents such over-heating of the metal or metals which may tend to destroy them or cause them to alloy or combine with injurious impurities.

In order that those skilled in the art may be thoroughly instructed in the use of my invention, I shall describe as a specific application thereof the recovery of aluminum from substances containing aluminum in its elemental state. A reverberatory furnace, well known in the art, is a suitable type of furnace for carrying out this method. Into the hearth of the furnace a suitable amount of sodium chlorid is charged. It is well to thoroughly puddle the charge during the initial heating process. When a liquid bath of the desired volume is obtained, it is raised to the fuming or distilling point. The charging of the substance is now started and quantities are thrown in from time to time, preferably with constant puddling, the charge being kept as liquid as possible at all times so as to allow the free settling of the globules of aluminum liberated. In this specific example, in order to prevent the charge from becoming too thick by absorbing the oxids of aluminum present in the by-product, converting them into a mass which is fusible at the working temperature, cryolite, in the proportion of ten per cent. of the total amount of sodium chlorid may be mixed with the aluminum by-product so that it can be gradually added to the working charge. Although the compound formed with this cryolite is a fusible slag, it need not be so far as the operation of the process is concerned if the relative specific gravities thereof and of the flux are such that it will be held in suspension.

Different metals may require different fluxes and I leave the selection thereof, limited by the physical properties hereinbefore pointed out, to the discretion of the engineer. I might state that it is necessary to continue the heating of the flux until the end of the smelting operation, the heating being regulated within the discretion of the engineer. The foreign substances may be removed from suspension in the flux in any suitable manner.

I claim as new and desire to secure by Letters Patent:

The process of recovering aluminum from substances containing aluminum in its elemental state, which consists in mixing cryolite with the substance and charging the mixture into a molten flux of sodium chlorid, there being sufficient sodium chlorid to entirely surround the charge, the sodium chlorid remaining chemically inert and the aluminum being melted by the latent heat of the sodium chlorid and settling to the bottom, while the remainder or slag is held in suspension in the flux, or floats thereon.

In witness whereof, I hereunto subscribe my name this 29th day of January, A. D., 1912.

CLINTON S. ROBISON.

Witnesses:
ARTHUR H. BOETTCHER,
LEONARD E. BOGUE.